(12) United States Patent
Angal et al.

(10) Patent No.: US 6,962,078 B2
(45) Date of Patent: Nov. 8, 2005

(54) LIQUID LEVEL DETECTION GAUGE AND ASSOCIATED METHODS

(75) Inventors: Aditya J. Angal, Lexington, KY (US); Mahesan Chelvayohan, Lexington, KY (US); Patrick L. Kroger, Versailles, KY (US); Herman A. Smith, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 113 days.

(21) Appl. No.: 10/328,505

(22) Filed: Dec. 24, 2002

(65) Prior Publication Data

US 2004/0119637 A1    Jun. 24, 2004

(51) Int. Cl.[7] .............................................. G01F 23/00
(52) U.S. Cl. ................................. 73/290 V; 73/290 R
(58) Field of Search .......................... 73/290 R, 290 V, 73/304 C, 290 B, 291, 301

(56) References Cited

U.S. PATENT DOCUMENTS

| | | |
|---|---|---|
| 4,133,453 A | 1/1979 | Ohbora |
| 4,201,085 A | 5/1980 | Larson |
| 4,989,754 A | 2/1991 | Grasso et al. |
| 5,289,211 A | 2/1994 | Morandotti et al. |
| 5,946,522 A | 8/1999 | Inami |
| 5,987,269 A | 11/1999 | Allen et al. |
| 5,997,121 A | 12/1999 | Altfather et al. |
| 6,007,173 A | 12/1999 | DeLouise et al. |
| 6,022,090 A | 2/2000 | Coudray et al. |
| 6,024,428 A | 2/2000 | Uchikata |
| 6,035,150 A | 3/2000 | Domon et al. |
| 6,151,039 A | 11/2000 | Hmelar et al. |
| 6,282,384 B1 | 8/2001 | Saito et al. |
| 6,302,503 B1 | 10/2001 | Seu |
| 6,302,527 B1 * | 10/2001 | Walker ........................ 347/50 |
| 6,322,205 B1 | 11/2001 | Childers et al. |
| 6,339,335 B1 | 1/2002 | Froger et al. |
| 6,349,184 B2 | 2/2002 | Otomo |
| 6,361,135 B1 | 3/2002 | Coudray et al. |
| 6,404,995 B1 | 6/2002 | Kimizuka |
| 6,409,302 B2 | 6/2002 | Altfather et al. |
| 6,415,112 B1 | 7/2002 | Kimizuka et al. |

(Continued)

FOREIGN PATENT DOCUMENTS

| | | |
|---|---|---|
| EP | 0028399 | 5/1981 |
| EP | 0882594 | 2/1998 |
| EP | 1219448 A2 | 5/1998 |
| EP | 1053881 | 11/2000 |
| EP | 1238811 | 3/2002 |
| EP | 1215748 | 6/2002 |
| EP | 1219448 A3 | 7/2002 |
| WO | WO 98/55318 | 12/1998 |

*Primary Examiner*—Daniel S. Larkin
*Assistant Examiner*—Rodney Frank (57) ABSTRACT

A gauge for detecting the level of ink in a printer's ink reservoir includes: a transmitter antenna adapted to be positioned adjacent to an outer surface of a printer's ink reservoir; a transmitter circuit operatively coupled to the transmitter antenna for generating a radio-frequency signal for transmission by the transmitter antenna; a receiver antenna; a receiver circuit for obtaining at least a portion of the radio-frequency signal received by the receiver antenna; and a processing circuit, operatively coupled to the receiver circuit, and configured to determine an approximate level of ink in the ink reservoir based upon, at least in part, a characteristic of the obtained portion of the radio-frequency signal, such as a voltage level of the obtained portion of the radio-frequency signal.

22 Claims, 4 Drawing Sheets

U.S. PATENT DOCUMENTS

| | | |
|---|---|---|
| 6,431,670 B1 | 8/2002 | Schantz et al. |
| 6,546,795 B1 * | 4/2003 | Dietz ........................ 73/290 R |
| 6,585,345 B2 * | 7/2003 | Kosugi ........................ 347/19 |
| 2001/0043259 A1 | 11/2001 | Ogata |
| 2002/0024571 A1 | 2/2002 | Childers et al. |
| 2002/0037173 A1 | 3/2002 | Kakeshita |
| 2002/0048463 A1 | 4/2002 | Otomo et al. |
| 2002/0063760 A1 | 5/2002 | Dietl et al. |
| 2002/0080205 A1 | 6/2002 | Kosugi |
| 2002/0126164 A1 | 9/2002 | Walker et al. |

* cited by examiner

LIQUID LEVEL DETECTION GAUGE AND ASSOCIATED METHODS

BACKGROUND

The present invention relates to liquid level detection; and, more particularly, to liquid level detection gauges that utilize radio-frequency (RF) transmissions.

Measuring ink levels inside ink tanks and ink-cartridges has been attempted utilizing several methods including: electrical resistance, capacitance and optical methods. Most of these prior methods require modifications to the ink cartridges such as adding electrodes or optical windows to the ink cartridges. Such modifications are not always desirable in the printing industry. Electrodes added to the inner surfaces of the cartridge can corrode over time. Optical methods have been successfully utilized in ink tanks, but not as successfully in foam reservoirs. Accordingly, a simple method that detects the amount of ink in ink tanks and cartridges is desirable.

SUMMARY

One embodiment of the present invention utilizes simple RF electronics to detect ink levels within ink tanks and ink cartridges. RF transmitters include transmitting electronics, a transmission line (the wires that carry the signal to the antenna), and an antenna. The efficiency of this transmission (the output power of the antenna) depends heavily upon the impedance matching characteristics of the transmitter. The impedance of the transmission line and the antenna depends upon factors such as capacitance and inductance. An exemplary embodiment of the present invention takes advantage of the principle in which the presence of a material next to a transmitter antenna affects the impedance of the antenna, and hence, the power output of the transmitter. The power output of the transmitter may be easily measured by placing a receiver antenna and circuit in the vicinity of the transmitter, where the power level of the received signal correlates to impedance matching characteristics of the transmitter and, in turn, approximates the level of ink within the ink tank or ink cartridge positioned next to the transmitter antenna.

Accordingly, it is a first aspect of the present invention to provide a gauge for detecting the level of ink in a printer's ink reservoir that includes: (a) a radio-frequency transmitter positioned approximate to a printer's ink reservoir; and (b) a processing circuit configured to determine an approximate level of ink in the ink reservoir based upon, at least in part, sensed impedance matching characteristics of the transmitter.

It is a second aspect of the present invention to provide a gauge for detecting the level of ink in a printer's ink reservoir that includes: (a) a transmitter antenna adapted to be positioned adjacent to an outer surface of a printer's ink reservoir; (b) a receiver antenna; (c) a transmitter circuit operatively coupled to the transmitter antenna for generating a radio-frequency signal for transmission by the transmitter antenna; (d) a receiver circuit for obtaining at least a portion of the radio-frequency signal received by the receiver antenna; and (e) a processing circuit, operatively coupled to the receiver circuit, and configured to determine an approximate level of ink in the ink reservoir based upon, at least in part, a characteristic of the obtained portion of the radio-frequency signal. In a more detailed embodiment, the characteristic includes a voltage level of the obtained portion of the radio-frequency signal. In an even more detailed embodiment, the level of ink in the ink reservoir is a function of the voltage level of the obtained portion of the radio-frequency signal. In an even more detailed embodiment, the level of ink in the ink reservoir is a function of the voltage level of the obtained portion of the radio-frequency signal according to a predetermined curve.

In an alternate detailed embodiment of the second aspect of the present invention, the transmitter antenna and/or the receiver antenna is formed by a trace extending along a surface of a circuit board. In a more detailed embodiment, each of the transmitter and receiver antennas are formed by respective traces extending along the surface of the circuit board. In an even more detailed embodiment, the respective traces of the transmitter and receiver antennas extend coaxially with respect to each other. In yet another further detailed embodiment, a portion of the circuit board seating the transmitter and receiver antennas traces is adapted to be mounted adjacent to an outer, vertical side-surface of the ink reservoir. In a further detailed embodiment, the ink reservoir is contained within a removable ink cartridge and the circuit board is mounted within a printer carriage adapted to receive a removable ink cartridge therein.

In another alternate detailed embodiment of the second aspect of the present invention, the transmitter antenna and/or the receiver antenna extends along the planar surface adjacent and parallel to an outer, vertical side-surface of the ink reservoir. In an even more detailed embodiment, each of the transmitter and receiver antennas extend along the planar surface adjacent and parallel to the outer, vertical side-surface of the ink reservoir. In an even more detailed embodiment, the transmitter and receiver antennas are positioned substantially coaxially with respect to each other. In an even more detailed embodiment, the ink reservoir is contained within a removable ink cartridge and the planar surface is part of a printer carriage adapted to receive a removable ink cartridge therein.

In another alternate detailed embodiment of the second aspect of the present invention, the ink reservoir is contained within a removable ink cartridge adapted to be removably received within a printer carriage, and the transmitter antenna and/or the receiver antenna is formed as a bias spring extending into the printer carriage and adapted to contact an outer, vertical side-surface of the ink cartridge. In a more detailed embodiment, the bias spring is cut to form the antenna loop of the antenna. In an even more detailed embodiment, the bias spring forms both the transmitter and receiver antennas. In yet an even more detailed embodiment, the bias spring is cut to form substantially coaxial antenna loops of the transmitter and receiver antennas.

It is a third aspect of the present invention to provide a gauge for detecting the level of ink in a printer's ink reservoir that includes: (a) a radio-frequency transmitter and a radio-frequency receiver positioned approximate to, and outside of the printer's ink reservoir; and (b) a processing circuit, operatively coupled to the receiver and configured to determine an approximate level of ink in the ink reservoir based upon, at least in part, a radio-frequency signal received by the receiver from the transmitter.

It is a fourth aspect of the present invention to provide a printer that includes: (a) an ink reservoir; and (b) a gauge for detecting an approximate level of ink in the ink reservoir, based upon, at least in part, an efficiency of transmitting radio-frequency signals adjacent to, and outside the ink reservoir. In a more detailed embodiment, the gauge includes: (1) a transmitter antenna positioned adjacent to an outer, vertical side-surface of the ink reservoir; (2) a receiver antenna; (3) a transmitter circuit operatively coupled to the transmitter antenna for generating a radio-frequency signal for transmission by the transmitter antenna; (4) a receiver circuit for obtaining at least a portion of the radio-frequency signal received by the receiver antenna; and (5) a processing circuit, operatively coupled to the receiver circuit, and configured to determine an approximate level of ink in the ink reservoir based upon, at least in part, the characteristic of the obtained portion of the radio-frequency signal. In an even more detailed embodiment, the printer further includes a printer carriage for seating a removable ink cartridge, the ink reservoir is contained within a removable ink cartridge that is adapted to be removably received within the printer carriage, and the transmitter antenna and/or the receiver antenna is formed as at least part of a bias spring extending into the printer carriage and adapted to contact an outer, vertical side-surface of the ink cartridge.

It is a fifth aspect of the present invention to provide a gauge for detecting the level of ink in a printer's ink reservoirs that includes: (a) a plurality of transmitter antennas, each adapted to be positioned adjacent to an outer surface of a respective one of the printer's ink reservoirs; (b) at least one receiver antenna; (c) at least one transmitter circuit operatively coupled to the transmitter antenna for generating a radio-frequency signal for transmission by the transmitter antenna; (d) at least one receiver circuit for obtaining at least a portion of the radio-frequency signal received by the receiver antenna; and (e) at least one processing circuit, operatively coupled to the receiver circuit, and configured to determine an approximate level of ink in the ink reservoirs based upon, at least in part, a characteristic of the obtained portions of the radio-frequency signals. In a more detailed embodiment, the gauge further includes: (f) a single transmitter circuit, and (g) a multiplexer operatively coupled between the transmitter circuit and the plurality of transmitter antennas for selectively sending the radio-frequency signal to each of the transmitter antennas.

It is a sixth aspect of the present invention to provide a method for determining an approximate level of ink in a printer's ink reservoir that includes the steps of: (a) positioning the transmitter antenna approximate an outer surface of a printer's ink reservoir; (b) providing a receiver antenna; (c) transmitting a radio-frequency signal by the transmitter antenna; (d) receiving the radio-frequency signal from the receiver antenna; and (e) determining an approximate level of ink in the ink reservoir based upon, at least in part, a characteristic of the received radio-frequency signal. In a more detailed embodiment, the determining step includes a step of determining the approximate level of ink in the ink reservoir based upon, at least in part, a voltage level of the received radio-frequency signal. In an even more detailed embodiment, the determining step further includes a step of comparing the voltage level of the received radio-frequency signal against a predetermined voltage versus ink-level curve.

In an alternate detailed embodiment of the sixth aspect of the present invention, the step of positioning the transmitter antenna approximate an outer surface of the printer's ink reservoir includes the steps of extending the transmitter antenna along a planar surface adjacent and parallel to an outer, vertical side-surface of the ink reservoir. In a further detailed embodiment, the method further includes the step of extending the receiver antenna along a planar surface adjacent and parallel to the outer, vertical side-surface of the ink reservoir. In a further detailed embodiment, the transmitter antenna and the receiver antenna extend along the same planar surface. In an even further detailed embodiment, the positioning steps include the step of orienting the antenna loops substantially coaxial with respect to each other. In an even further detailed embodiment, the ink reservoir is contained within a removable ink cartridge and the planar surface is part of a printer carriage adapted to receive the removable ink cartridge therein.

In yet another alternate detailed embodiment of the sixth aspect of the present invention, the ink reservoir is contained within a removable ink cartridge adapted to be removably received within a printer carriage, the transmitter antenna is formed as a bias spring (or as part of a bias spring) extending into the printer carriage, and the positioning step includes the step of contacting an outer, vertical side-surface of the ink cartridge with the bias spring. In a further detailed embodiment, the method further includes the step of cutting the bias spring to form an antenna loop of the transmitter antenna. In yet a further detailed embodiment, the bias spring forms both the transmitter and receiver antennas. In yet a further detailed embodiment, the method further includes the step of cutting the bias spring to form substantially coaxial antenna loops of the transmitter and receiver antennas.

In yet another alternate detailed embodiment of the sixth aspect of the present invention, the step of positioning the transmitter antenna approximate an outer surface of the printer's ink reservoir includes the step of extending the transmitter antenna in a loop along a planar, vertical side-surface of the ink reservoir. In a further detailed embodiment, the method further includes the step of extending the receiver antenna in a loop along the planar outer, vertical side-surface of the ink reservoir. In yet a further detailed embodiment, the transmitter antenna and the receiver antenna extend along the same planar, outer, vertical side-surface of the ink reservoir. In yet a further detailed embodiment, the positioning steps include the step of orienting the antenna loops substantially coaxial with each other.

It is a seventh aspect of the present invention to provide a method for detecting the level of an ink in a printer's ink reservoir comprising the steps of: providing a radio-frequency transmitter having a transmitter antenna; positioning the transmitter antenna with respect to a printer's ink reservoir such that the level of ink in the reservoir affects the impedance matching characteristics of the radio-frequency transmitter; sensing the impedance matching characteristics of the radio-frequency transmitter; and approximating the level of ink in the printer's ink reservoir based upon, at least in part, the sensed impedance matching characteristics of the transmitter. In a more detailed embodiment, the positioning step includes the step of positioning the transmitter antenna adjacent to a vertical side surface of the printer's ink reservoir. In an even more detailed embodiment, the transmitter antenna extends along a planar surface substantially parallel to the vertical side surface of the printer's ink reservoir.

In an alternate detailed embodiment to the seventh aspect of the present invention, the sensing step includes the steps of: receiving, by a radio-frequency receiver, a radio-frequency signal transmitted by the radio-frequency transmitter; and determining a power-level and/or a voltage-level of the received radio-frequency signal. In a more detailed embodiment, the approximating step includes the step of comparing a voltage-level of the received radio-frequency signal against a predetermined voltage-level versus ink-level curve. In an alternate detailed embodiment, the radio frequency receiver includes a receiver antenna, and the method further includes the step of positioning the receiver antenna in close proximity to the transmitter antenna. In a more detailed embodiment, the transmitter and receiver antennas are positioned to extend along respective planes substantially parallel to a vertical side surface of the printer's ink reservoir. In an even more detailed embodiment, the transmitter and receiver antennas are positioned to extend in substantially coaxial loops along a single plane substantially parallel to the vertical side surface of the printer's ink reservoir.

It is an eighth aspect of the invention to provide a gauge for detecting the level of a liquid in a liquid reservoir that includes: (a) a transmitter antenna adapted to be positioned adjacent to a surface of a liquid reservoir; (b) a receiver antenna; (c) a transmitter circuit operatively coupled to the transmitter antenna for generating a radio-frequency signal for transmission by the transmitter antenna; (d) a receiver circuit for obtaining at least a portion of the radio-frequency signal received by the receiver antenna; and (e) a processing circuit, operatively coupled to the receiver circuit, and configured to determine an approximate level of liquid in the liquid reservoir based upon, at least in part, a characteristic of the obtained portion of the radio-frequency signal. In a more detailed embodiment, this characteristic includes a voltage level of the obtained portion of the radio-frequency signal. And in yet an even more detailed embodiment, the level of liquid in the liquid reservoir is based upon a comparison of the voltage level of the obtained portion of the radio-frequency signal against a predetermined voltage versus liquid-level curve. In an alternate detailed embodiment, the transmitter and receiver antennas extend along a plane parallel to a planer, outer, vertical side-surface of the liquid reservoir. In a more detailed embodiment, the transmitter and receiver antennas extend in substantially coaxial loops along a single plane parallel to the outer, vertical side-surface of the reservoir.

It is a ninth aspect of the present invention to provide a method for detecting the level of a liquid in a liquid reservoir comprising the steps of: providing a radio-frequency transmitter having a transmitter antenna; positioning the transmitter antenna with respect to a liquid reservoir such that the level of liquid in the reservoir affects the impedance matching characteristics of the radio-frequency transmitter; sensing the impedance matching characteristics of the radio-frequency transmitter; and approximating the level of liquid in the reservoir based upon, at least in part, the sensed impedance matching characteristics of the transmitter. In a more detailed embodiment, the positioning step includes the step of positioning the transmitter antenna adjacent to a vertical side surface of the reservoir. In an even more detailed embodiment, the transmitter antenna extends along a planar surface substantially parallel to the vertical side surface of the reservoir.

In an alternate detailed embodiment to the ninth aspect of the present invention, the sensing step includes the steps of: receiving, by a radio-frequency receiver, a radio-frequency signal transmitted by the radio-frequency transmitter; and determining at least one of a power-level and a voltage-level of the received radio-frequency signal. In a more detailed embodiment, the approximating step includes the step of comparing a voltage-level of the received radio-frequency signal against a predetermined voltage-level versus liquid-level curve. In an alternate detailed embodiment, the radio frequency receiver includes a receiver antenna, and the method further includes the step of positioning the receiver antenna in close proximity to the transmitter antenna. In a more detailed embodiment, the transmitter and receiver antennas are positioned to extend along respective planes substantially parallel to a vertical side surface of the reservoir. In an even more detailed embodiment, the transmitter and receiver antennas are positioned to extend in substantially coaxial loops along a single plane substantially parallel to the vertical side surface of the reservoir.

For the purposes of the present disclosure, the term ink reservoir is intended to include any type of ink reservoir of a printer, or for use with a printer. Accordingly, for the purposes of the present disclosure, ink tanks and ink reservoirs in removable ink-cartridges (with or without foam), for example, are considered ink reservoirs. The invention is applicable to both conductive and non-conductive inks.

DETAILED DESCRIPTION

One embodiment of the present invention utilizes simple RF electronics to detect ink levels within ink tanks and ink cartridges. RF transmitters include transmitting electronics, a transmission line (the wires that carry the signal to the antenna), and an antenna. The efficiency of this transmission (the output power of the antenna) depends heavily upon the impedance matching characteristics of the transmitter. The impedance of the transmission line and the antenna depends upon factors such as capacitance and inductance. An exemplary embodiment of the present invention takes advantage of the principle in which the presence of a material next to a transmitter antenna affects the impedance of the antenna, and hence, the power output of the transmitter.

According to exemplary embodiments of the present invention, the power output of the transmitter is measured by placing a receiver antenna and circuit approximate to the transmitter, which is transmitting an RF signal (the radio frequency band goes from 3 KHz to 300 GHz); where the power level of the signal received by the receiver antenna correlates to impedance matching characteristics of the transmitter and, in turn, approximates the level of ink within the ink reservoir positioned next to the transmitter antenna.

Figure 1:
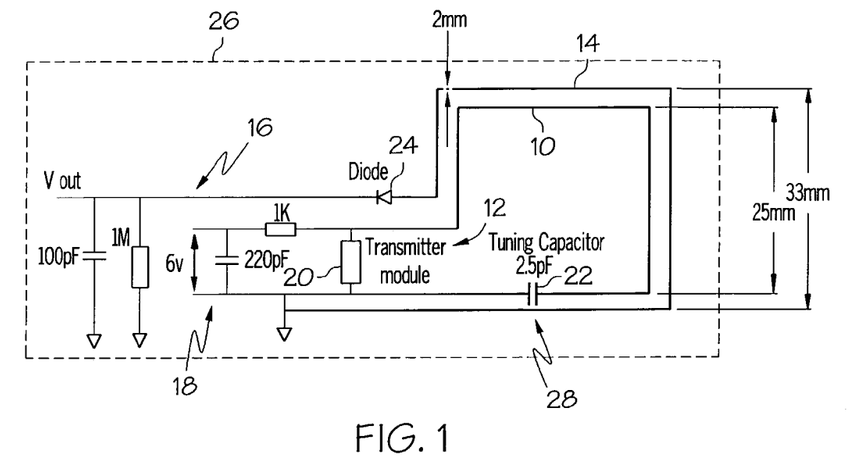
FIG. 1 is a schematic circuit diagram of an ink level detection gauge according to an exemplary embodiment of the present invention.

As shown in FIG. 1, an exemplary gauge for detecting the level of ink in a printer's ink reservoir, which may be contained within an ink cartridge for example, includes an RF (radio-frequency) transmitter antenna 10 operatively coupled to its transmitter circuitry 12 and an RF receiver antenna 14 operatively coupled to receiver circuitry 16. In the exemplary embodiment, the transmitter circuitry 12 includes a six-volt power source 18 operatively coupled to a transmitter module 20 for generating an RF signal on the transmitter antenna 10. The tuning capacitor 22, which is a 2.5 pF capacitor in this exemplary embodiment, is coupled in series with the transmitter antenna 10. The exemplary transmitter module 20 is commercially available from Abacom Technologies as a model AM-TX1-433, 433 MHz RF Transmitter module.

The receiver circuitry 16 is essentially a voltage rectifier circuit that is operatively coupled to a processor circuit (not shown) for converting the voltage output into an approximate ink level reading as will be described in further detail below. In the exemplary embodiment, the diode of the voltage rectifier circuit is a Motorola Schotkey Diode MBD 701. The processor circuit may be of any design known to those of ordinary skill in the art. Nevertheless, it is envisioned that the processor circuit of the exemplary embodiment be one of the internal processor circuits of the printer in which the gauge is mounted. Appropriate A/D converters may also be utilized to interface between the processor circuit and the receiver circuitry 16.

Figure 2:
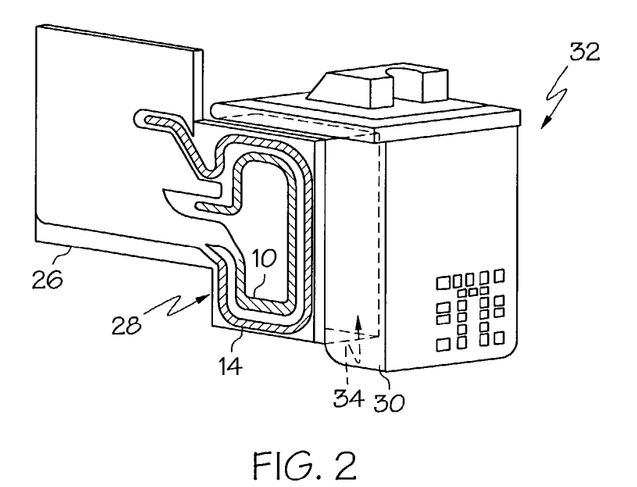
FIG. 2 is a perspective view of an exemplary ink level detection gauge mounted approximate a printer's ink cartridge.

Referring to FIGS. 1 and 2, in the exemplary embodiment, the circuitry and antennas are provided on a printed circuit board 26. The transmitter antenna 10 and the receiver antenna 14 are traces printed directly on the circuit board. In the exemplary embodiment, each antenna forms substantially concentric loops on the sensor portion 28 of the circuit board. In the exemplary embodiment, each trace is approximately 2 mm wide and the antennas are spaced approximately 2 mm from each other. While the transmitter antenna loop is approximately 25 mm in diameter, the receiver antenna loop is approximately 33 mm in diameter.

Referring to FIG. 2, the sensor portion 28 of the circuit board 26 is positioned adjacent to and parallel with a vertical side wall 30 of the printer cartridge 32 such that the sensor portion 28 is aligned with a vertically extending ink reservoir 34 within the printer cartridge 32. As will be discussed in further detail below, the sensor readings for the gauge depend upon the vertical level of ink within the reservoir 34 as opposed to horizontal depth of the reservoir, i.e., available volume.

While the exemplary embodiment of FIG. 2 utilizes a circuit board 26 to seat transmitter and receiver antennas, it is within the scope of the invention that either or both of the transmitter and receiver antennas may extend along any surface (planar or otherwise) positioned adjacent to a printer's ink reservoir. An example of such a sensor surface may include an inner, vertically extending side surface of a removable ink-cartridge carriage within a printer; such that this sensor surface will be positioned approximate the ink-cartridge's ink reservoir when the ink-cartridge is received within the carriage. It is also within the scope of the invention to extend the antennas (or at least the transmitter antenna) along a vertical side surface of the ink reservoir itself.

Figure 3:
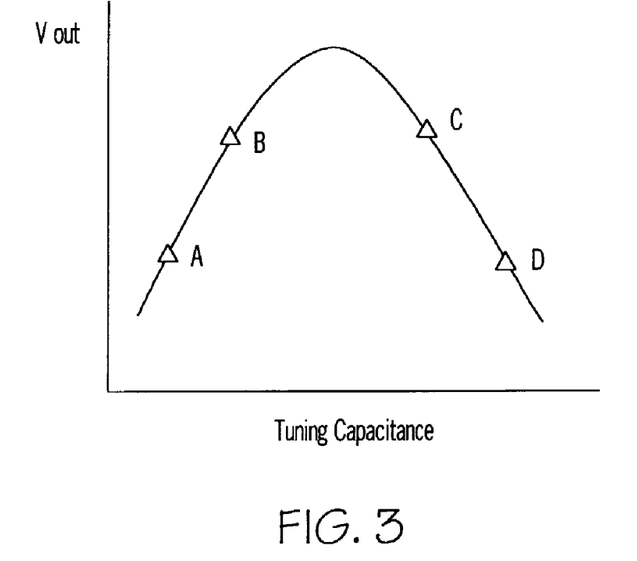
FIG. 3 is a received voltage signal versus tuning capacitance curve useful for selecting a tuning capacitor for the transmitter circuit according to an exemplary embodiment of the present invention.

As shown in FIG. 3, the output "V-out" of the receiver circuit is sensitive to the tuning capacitance of capacitor 22 as plotted. If the capacitor 22 is tuned so that the operating point is at point A, the output voltage V-out will increase towards point B as the level of ink in the ink cartridge increases. Likewise, if the operating point of the capacitor 22 is set at point C, then the output V-out will decrease towards point D as the level of ink within the ink reservoir increases. In the exemplary embodiment, the tuning capacitor 22 has been selected with a fixed value so the V-out is approximate to point C when the reservoir is substantially empty and so that V-out is approximate to point D when the reservoir is substantially full.

It is envisioned that the level of ink within a particular ink reservoir will be determined (by the printer's processor, for example) based upon a predetermined voltage versus ink-level curve. Examples of voltage versus ink-level curves are shown in FIGS. 4 and 5.

Figure 4:
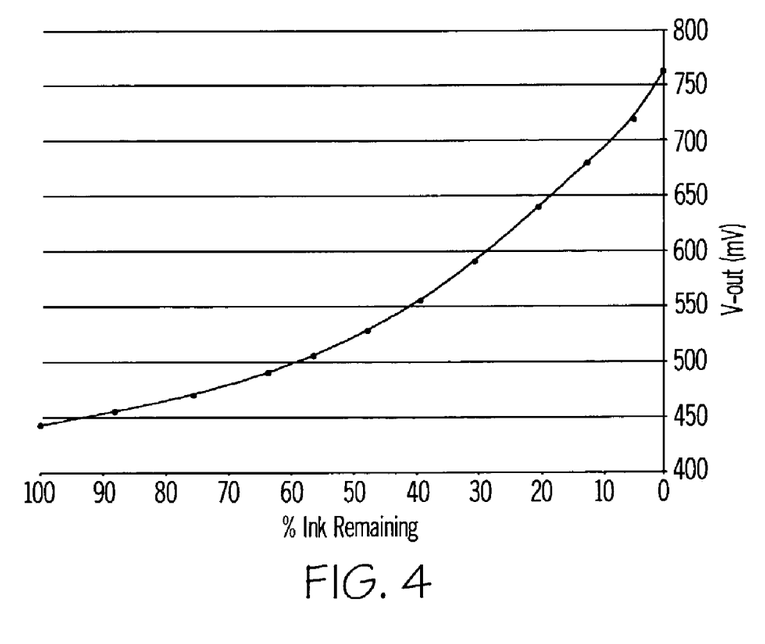
FIG. 4 is an example diagram plotting the voltage level received by the receiver circuit versus remaining ink in an ink cartridge (with foam)

The curve shown in FIG. 4 is based upon data taken from a color ink cartridge (with foam inside). As shown by the curve of FIG. 4, the output signal (V-out) for a full cartridge measures about 450 mV and the output signal increases as the ink level goes down. When the cartridge is "empty" the output signal measures about 750 mV. The "empty" cartridge may still contain some ink that wets the foam, but can no longer be used for printing.

Figure 5:
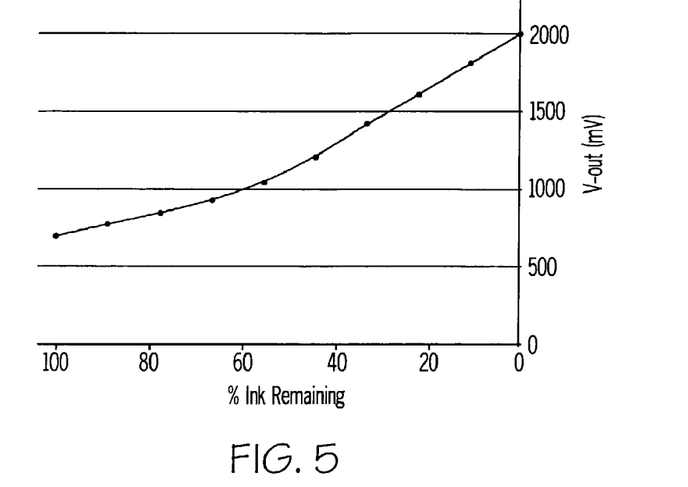
FIG. 5 is another example diagram plotting the voltage level received by the receiver circuit versus remaining ink in an ink tank.

The curve shown in FIG. 5 is a curve based upon data taken from an ink tank. The output signal (V-out) goes from 600 mV to 200 mV when the tank goes from full to "empty". In ink tanks, "empty" means the tank is truly empty—which makes the output signal go much higher than for an empty cartridge with foam inside.

From each of these curves it can be seen that the output voltage V-out increases as the level of ink within the ink reservoir decreases towards zero percent ink. Based upon such data, the processor may easily approximate the amount of ink remaining within the ink reservoir based upon the output voltage using look-up tables or other algorithms for example.

Figure 6:
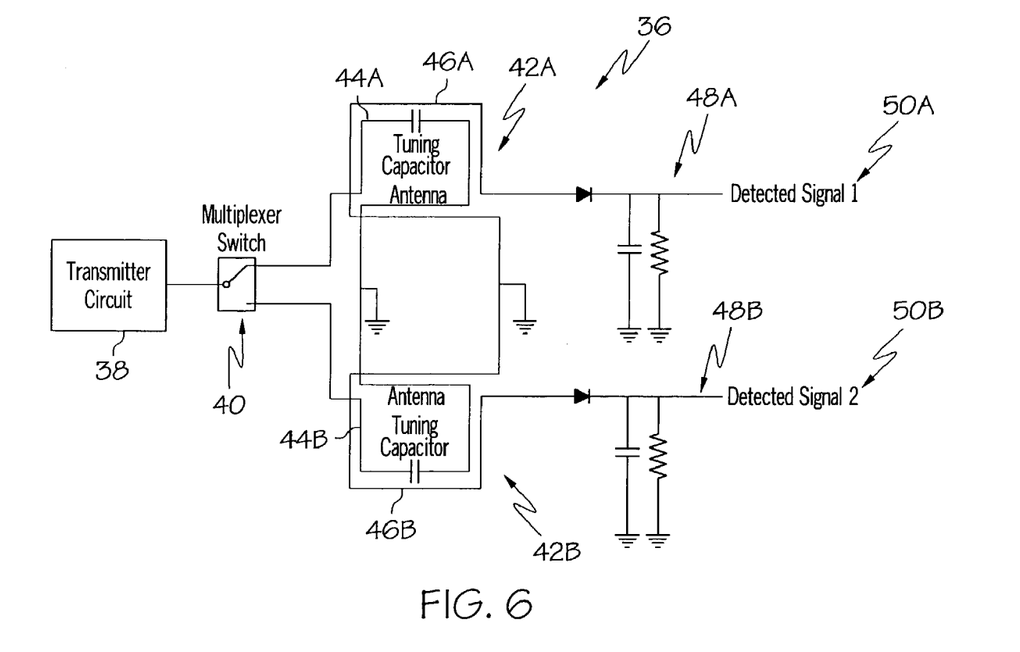
FIG. 6 is a schematic circuit diagram of a second exemplary gauge according to an aspect of the present invention.

It is also possible to use a single transmitter circuit multiplexed with several transmitting antennas and receiving electronics to detect ink levels in multiple ink reservoirs. As shown in FIG. 6, an example of such a multiplexed gauge 36 includes a single transmitter circuit 38 operatively coupled to a multiplexer switch 40, which is in turn coupled to two sensor circuits, 42A and 42B. As with the exemplary embodiment, each sensor circuit includes a transmitter antenna 44A, 44B, operatively coupled to the output of the multiplexer 40, and a receiver antenna 46A, 46B, operatively coupled to respective receiver circuitry 48A, 48B, each providing output voltage signals 50A, 50B.

Because the sensor according to the exemplary embodiments of the present invention is only sensitive for a few millimeters from the surface of the cartridge, multiple sensors can be used on a single ink cartridge having multiple internal ink reservoirs. And, therefore, the sensor portions 28 of several circuit boards (or sensor surfaces) may be positioned approximate the several vertical side walls of an ink-cartridge that are adjacent to respective internal reservoirs of the ink-cartridge to measure the level of ink within these respective internal reservoirs.

Figure 7:
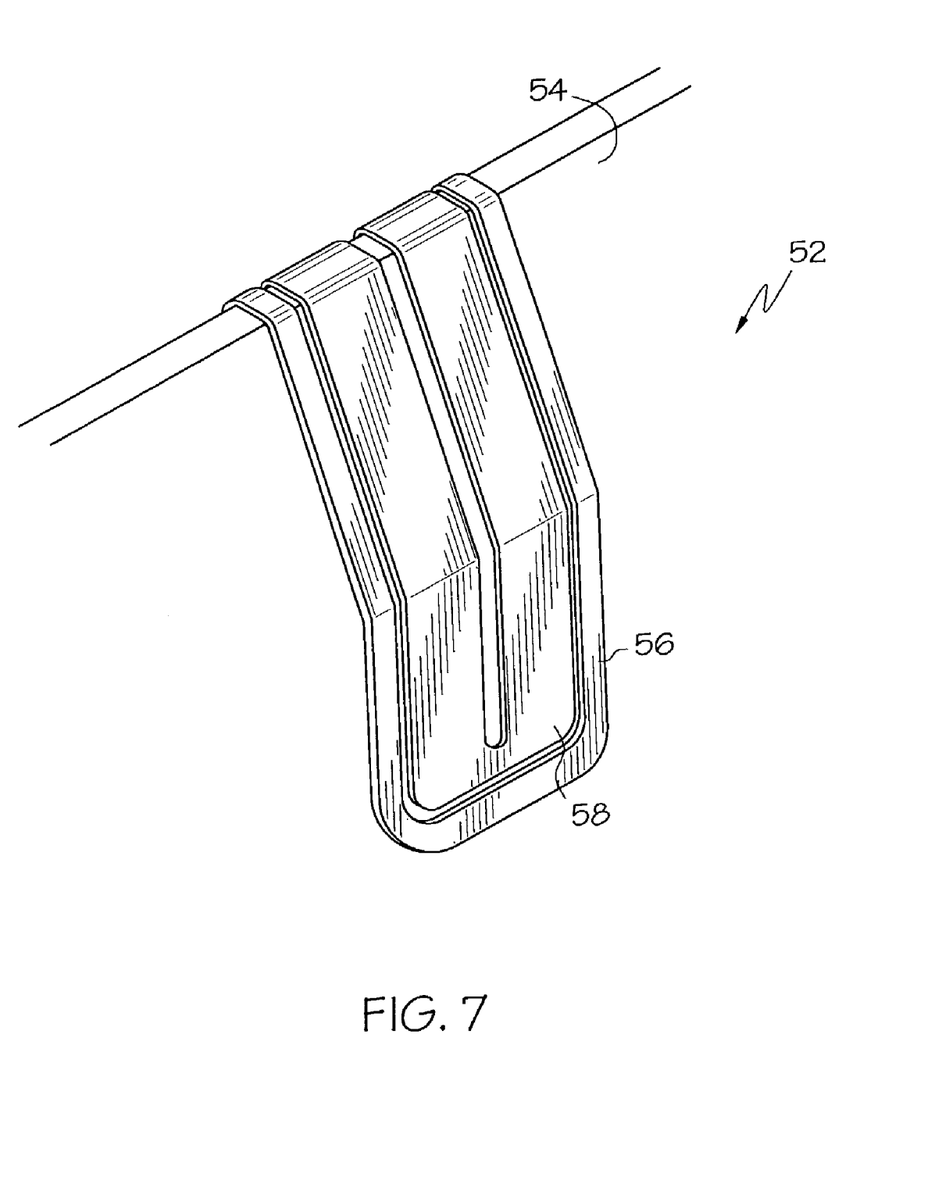
FIG. 7 is a perspective view of a bias spring according to an exemplary aspect of the present invention cut to form a pair of transmitter and receiver antennas.

As shown in FIG. 7, a bias spring 52 typically used for maintaining the printer cartridge within the print carriage 54 may be cut to form two substantially concentric loops 56, 58, where the outer loop 56 is operatively coupled to the receiver circuitry (as described above) so that the outer loop becomes a receiver antenna; and where the inner loop 58 is operatively coupled to the transmitter circuitry (as described above) to form the transmitter antenna. Thus, when the removable printer cartridge is placed within the carriage 54, the spring 52 abuts against a vertical side of the printer cartridge adjacent to an internal ink reservoir such that the spring can be used as the transmitter and receiver antennas as described herein.

While the above embodiments have been described primarily for use with detecting inks within ink reservoirs of printers; it will be apparent to those of ordinary skill in the art that the invention described herein can be extended to other liquid level and presence detection applications where available detection methods are limited. Accordingly, it is within the scope of the invention to provide a gauge for detecting the level of a liquid in a liquid reservoir that includes: (a) a transmitter antenna adapted to be positioned adjacent to a surface of a liquid reservoir; (b) a receiver antenna; (c) a transmitter circuit operatively coupled to the transmitter antenna for generating a radio-frequency signal for transmission by the transmitter antenna; (d) a receiver circuit for obtaining at least a portion of the radio-frequency signal received by the receiver antenna; and (e) a processing circuit, operatively coupled to the receiver circuit, and configured to determine an approximate level of liquid in the liquid reservoir based upon, at least in part, a characteristic of the obtained portion of the radio-frequency signal. In a more detailed embodiment, this characteristic includes a voltage level of the obtained portion of the radio-frequency signal. And in yet an even more detailed embodiment, the level of liquid in the liquid reservoir is based upon a comparison of the voltage level of the obtained portion of the radio-frequency signal against a predetermined voltage versus liquid-level curve. In an alternate detailed embodiment, the transmitter and receiver antennas extend along a plane parallel to a planer, outer, vertical side-surface of the liquid reservoir. In a more detailed embodiment, the transmitter and receiver antennas extend in substantially coaxial loops along a single plane parallel to the outer, vertical side-surface of the reservoir.

Thus, following from the above description and invention summaries, it should be apparent to those of ordinary skill in the art that, while the apparatuses and processes herein described constitute exemplary embodiments of the present invention, it is to be understood that the invention is not limited to these precise apparatuses and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements or explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A gauge for detecting the level of ink in a printer's ink reservoir comprising:
    a transmitter antenna adapted to be positioned adjacent to an outer surface of a printer's ink reservoir;
    a receiver antenna;
    a transmitter circuit operatively coupled to the transmitter antenna for generating a radio-frequency signal for transmission by the transmitter antenna;
    a receiver circuit for obtaining at least a portion of the radio-frequency signal received by the receiver antenna; and
    a processing circuit, operatively coupled to the receiver circuit, and configured to determine an approximate level of ink in the ink reservoir based upon, at least in part, a characteristic of the obtained portion of the radio-frequency signal;
    wherein at least one of the transmitter and receiver antennas lies in a plane adjacent and substantially parallel to an outer, substantially vertical side-surface of the ink reservoir.

2. The gauge of claim 1, wherein the characteristic includes a voltage level of the obtained portion of the radio-frequency signal.

3. The gauge of claim 2, wherein the level of ink in the ink reservoir is a function of the voltage level of the obtained portion of the radio-frequency signal.

4. The gauge of claim 3, wherein the level of ink in the ink reservoir is a function of the voltage level of the obtained portion of the radio-frequency signal according to a predetermined curve.

5. The gauge of claim 1, wherein at least one of the transmitter and receiver antennas is formed by a trace extending along a surface of a circuit board.

6. The gauge of claim 5, wherein each of the transmitter and receiver antennas is formed by respective traces extending along the surface of the circuit board.

7. The gauge of claim 6, wherein the respective traces of the transmitter and receiver antennas extend coaxially with respect to each other.

8. The gauge of claim 7, wherein the transmitter antenna trace is positioned coaxially within the receiver antenna trace.

9. The gauge of claim 6, wherein a portion of the circuit board seating the transmitter and receiver antennas traces is adapted to be mounted adjacent to an outer, vertical side-surface of the ink reservoir.

10. The gauge of claim 9, wherein the ink reservoir is contained within a removable ink cartridge and the circuit board is mounted within a printer carriage adapted to receive the removable ink cartridge therein.

11. The gauge of claim 1, wherein at least one of the transmitter and receiver antennas extend along a planar surface adjacent and parallel to an outer, vertical side-surface of the ink reservoir.

12. The gauge of claim 11, wherein each of the transmitter and receiver antennas extend along the planar surface adjacent and parallel to the outer, vertical side-surface of the ink reservoir.

13. The gauge of claim 12, wherein one of the transmitter and receiver antennas is positioned coaxially within the other.

14. The gauge of claim 13, wherein the ink reservoir is contained within a removable ink cartridge and the planar surface is part of a printer carriage adapted to receive the removable ink cartridge therein.

15. The gauge of claim 1, wherein:
    the ink reservoir is contained within a removable ink cartridge adapted to be removably received within a printer carriage; and
    at least one of the transmitter and receiver antennas is formed as a bias spring extending into the printer carriage and adapted to contact an outer, vertical side-surface of the ink cartridge.

16. The gauge of claim 15, wherein the bias spring is cut to form the antenna loop of the one antenna.

17. The gauge of claim 15, wherein the bias spring forms both the transmitter and receiver antennas.

18. The gauge of claim 17, wherein the bias spring is cut to form substantially coaxial antenna loops of the transmitter and receiver antennas.

19. The gauge of claim 1, wherein:
the ink reservoir is contained within a removable ink cartridge adapted to be removably received within a printer carriage; and
at least one of the transmitter and receiver antennas is formed as at least part of a bias spring extending into a printer carriage and adapted to contact an outer, vertical side-surface of the ink cartridge.

20. A gauge for detecting the level of ink in a printer's ink reservoir comprising:
a radio-frequency transmitter positioned approximate to a printer's ink reservoir; and
a processing circuit configured to determine an approximate level of ink in the ink reservoir based upon, at least in part, sensed impedance matching characteristics of the transmitter.

21. A gauge for detecting the level of ink in a printer's ink reservoirs comprising:
a plurality of transmitter antennas, each adapted to be positioned adjacent to an outer surface of a respective one of a printer's ink reservoirs;
at least one receiver antenna;
at least one transmitter circuit operatively coupled to the transmitter antennas for generating a radio-frequency signal for transmission by the transmitter antennas;
at least one receiver circuit for obtaining at least a portion of the radio-frequency signal received by the receiver antenna; and
at least one processing circuit, operatively coupled to the receiver circuit, and configured to determine an approximate level of ink in the ink reservoirs based upon, at least in part, a characteristic of the obtained portions of the radio-frequency signals;
wherein at least one of the transmitter and receiver antennas lies in a plane adjacent and substantially parallel to an outer, substantially vertical side-surface of the ink reservoir.

22. The gauge of claim 21, further comprising a multiplexer operatively coupled between the transmitter circuit and the transmitter antennas for selectively sending the radio-frequency signal to each of the transmitter antennas.

* * * * *